Oct. 12, 1926. Re. 16,438

E. W. ENGLE

BATTERY CHARGER

Original Filed August 19, 1922 3 Sheets-Sheet 1

Inventor
Edgar W. Engle
By Williams, Bradbury, McCaleb & Hinkle
Attorneys.

Oct. 12, 1926.

Re. 16,438

E. W. ENGLE

BATTERY CHARGER

Original Filed August 19, 1922 3 Sheets-Sheet 2

Inventor
Edgar W. Engle.
By Williams, Bradbury, McCaleb & Hinkle
Attorneys.

Oct. 12, 1926.

Re. 16,438

E. W. ENGLE

BATTERY CHARGER

Original Filed August 19, 1922 3 Sheets-Sheet 3

Inventor
Edgar W. Engle
By Williams, Bradbury, McCaleb & Hinkle
Attorneys.

Reissued Oct. 12, 1926.

Re. 16,438

UNITED STATES PATENT OFFICE.

EDGAR W. ENGLE, OF LAKE FOREST, ILLINOIS, ASSIGNOR TO FANSTEEL PRODUCTS COMPANY, INC., OF NORTH CHICAGO, ILLINOIS, A CORPORATION OF NEW YORK.

BATTERY CHARGER.

Original applications filed August 19, 1922, Serial No. 582,851, and October 16, 1923, Serial No. 668,938. Continued and application filed March 27, 1924, Serial No. 702,278. Original No. 1,495,582, dated May 27, 1924. Application for reissue filed May 21, 1925. Serial No. 32,492.

This invention relates to a battery charger or rectifier, and particularly to a self-contained device of this kind adapted to be used to charge from a source of alternating current storage batteries of the character used in connection with automobile starting and lighting systems and radio equipment.

The object of the invention is to provide an improved battery charger which will be efficient and noiseless in operation, which will have a substantially constant charging rate, and which will be simple and durable in construction.

Other objects and advantages will appear from time to time as the description of the invention progresses.

This application is a continuation of my applications Serial Nos. 582,851, filed August 19, 1922, and 668,938, filed October 16, 1923.

It is believed the invention will be understood most readily from a detailed description thereof taken in connection with the accompanying drawings, in which—

Figure 5:
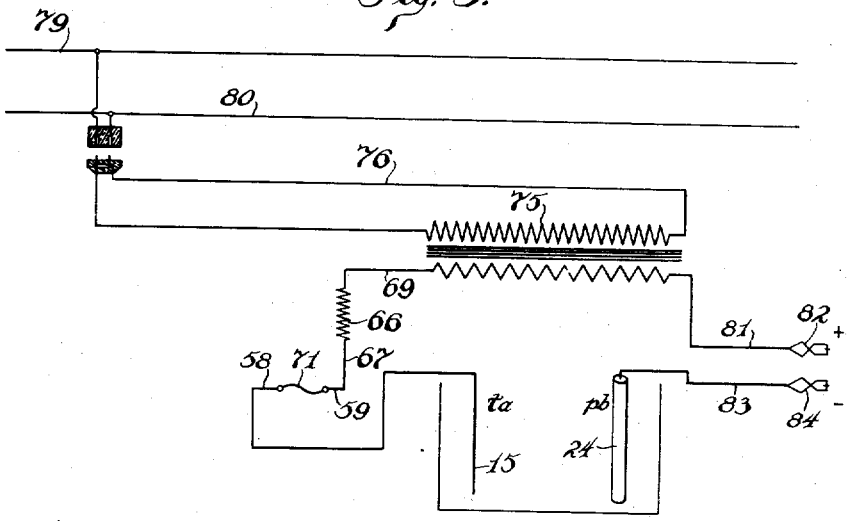
Figure 6:
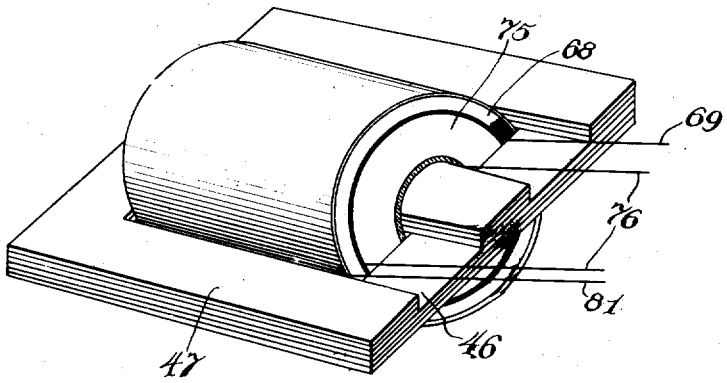

Figure 5 schematically indicates the circuit connections of the various elements of the battery charger, and Figure 6 schematically indicates the construction and arrangement of the transformer core and coils.

Referring now to the drawings, in which like reference characters indicate like parts in the several views, 10 indicates the charger container of wood or other suitable material. The container 10 is provided with a bail 11 and the supporting legs or pads 12 of rubber or other suitable material. The container is provided at the top and substantially centrally thereof with the transversely extending strip 13 which forms a partial partition between the portion of the container in which is positioned the rectifier cell and the portion in which the transformer and similar elements are positioned.

The rectifying element of the present invention consists of an anode 14 of lead, and a cathode 15 of tantalum in an electrolyte, preferably of dilute acid, as sulphuric acid. Sulphuric acid of 1.25 specific gravity has been found satisfactory. It has been found that tantalum has the property of permitting current to flow from the electrolyte to the tantalum electrode but preventing the flow of electricity in the reverse direction. The electrolyte is confined in a cell 16 of lead in the present embodiment of the invention, although it may be of other satisfactory material as hard rubber. The anode 14 preferably has a small amount of antimony mixed with the lead in order to make it more resistive to the action of the electrolyte. If a hard rubber cell is employed, it may be fitted within a casing of lead or similar material having heat radiating flanges.

Fixed to the bottom of the cell 16, or integral therewith, are the downwardly extending supporting members 17, each of which is provided with a pair of laterally extending feet 18 secured to the bottom of the container 10 by means of the bolts 19. The sides of the cell 16 are provided with the laterally extending heat radiating wings or flanges 20 which act to position the cell 16 between one side of the container 10 and the partition member 13. The cell is positioned against movement lengthwise thereof by the ends of the cell engaging the container. Positioned between pairs of the flanges 20 are the laterally extending shelves 22, each pair of which is provided with aligned openings 23 within which are fixed the insulator 24 of porcelain or other desired material.

The top of the cell 16 is provided with a cover 25 of hard rubber or other suitable material. The plate 25 is provided with a filler cap opening 26 within which is inserted the cap 27 having the vent openings 28 therein. The cover 25 is also provided with the tapered openings 29 and 30. Positioned within the opening or recess 29 is the sleeve 32 of hard rubber or other suitable material. The sleeve 32 is externally threaded at its lower end and is provided with the nut 33 by means of which the sleeve 32 is firmly secured in position. Extending longitudinally of the sleeve 32 is the recess 34 which terminates at the lower end thereof in the rectangular opening 35 through which the cathode 15 extends. The upper end of the cathode 15 is cast in or otherwise secured to the lower end of the terminal post 31. A satisfactory manner of securing the tantalum is as follows:

A composition of lead containing antimony will expand upon cooling. About 6% of antimony has been found to give good results. If the terminal post 31 of the lead-antimony compound is cast about the end of the tantalum strip, the outside hardens first, due to contact with the mould. This forms a restraining envelope within which is the still liquid metal surounding the tantalum strip.

As this inner molten metal hardens, it tends to expand, but being restrained by the outer shell, the end of the cathode is firmly gripped by the lead. The terminal post 31 is provided with an annular ridge 36. The post 31 and the cathode 15 are secured in position as follows:

The recess 34 having been filled with an acid-resisting compound, as asphaltic cement, the lower end of the post 31 is forced into the top of the recess 34 before the cement has hardened. After the post 31 has been put in position, as just described, the top portion of the recess 29 is also filled with battery sealing cement in order firmly to anchor the post 31. Surrounding the cathode 15, adjacent to the lower end thereof, is a block 37 of acid-resisting material, as soft rubber, which is maintained in position by means of the portions 38 turned from the lower end of the cathode 15.

The bottom of the cell 16, adjacent to one one thereof, is provided with the annular flange 39 within which is positioned the lower end of the anode 14, a collar 40 of insulating material, as hard rubber, being provided between the flange 39 and the anode 14 in order to prevent engagement. The anode 14 is provided with an enlarged portion or bead 41 which engages the top of the collar 40 in order to support the anode. The upper end of the anode 14 passes upwardly through the tapered recess 30 and is provided with a flange 42 which engages the bottom of the cover 25. The space within the recess 30 about the upper end 43 of the anode 14 is filled with an acid-resisting cement, as asphaltic cement.

Secured to the upper ends of the terminal posts 31 and 43, respectively, are the rods 44 and 45 of lead or other conducting material which extends laterally and then downwardly through the insulating sleeves 24.

The transformer consists of the core member formed of the E-shaped laminations 46 and 47 about the tongues of which are positioned the primary coil 48 and the secondary coil 49. The transformer shown comprises a primary of about 440 turns of No. 22 wire, and a secondary of about 71 turns of No. 15 wire. This transformer when joined to a 110 volt light circuit gives an output voltage of approximately 18½ volts.

Positioned on opposite sides of the laminations 46 and 47 are the clamping members 50 which are held firmly in engagement with the laminations by means of the bolts 51. The lower ends of the members 50 are provided with the laterally extending perforated portions 52 which are secured to the bottom of the container 10 by means of the screws 53. The upper ends of the clamping members 50 are provided with the laterally extending portions 54, each of which is provided with a screw threaded opening 55. Positioned on the laterally extending portions 54 is a plate 56 of bakelite, fibre, or other suitable insulating material which is secured to the portions 54 by means of the screws 57 which pass downwardly through the plate 56 and into the screw threaded openings 55. The fuse clips 58 and 59 are secured to the top of the plate 56 by means of the bolts 60 and 61, respectively, provided with the securing nuts 62 and 63.

Figure 4:
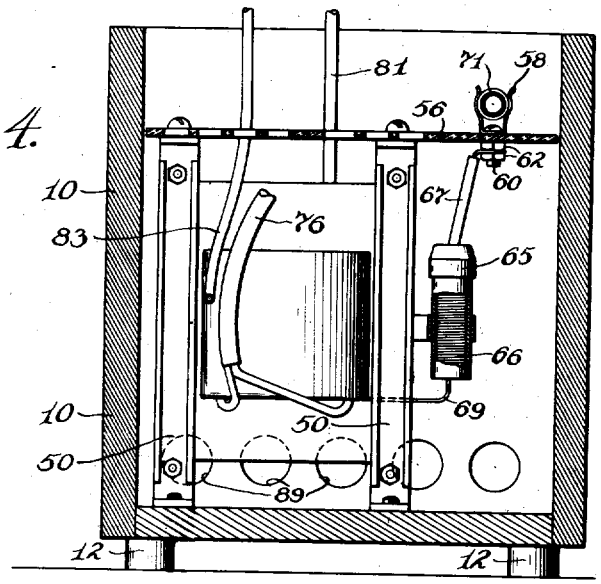
Figure 4 is a section on line 4—4 of Figure 1.

Fixed to the transformer core, in any desired manner, or otherwise mounted is a sleeve 65 of porcelain or other suitable insulating material, within which is spirally arranged a limiting resistance coil 66, preferably of nickel wire. The wire 66 may be approximately .025″ in diameter, and about 16½″ in length. After the coil 66 has been placed in position, the ends of the sleeve 65 are closed by some suitable mineral cement. This acts partially to retain the heat generated by the coil and causes its properties to be more constant. Nickel wire has been found preferable because it offers increased resistance upon increase of the current flow. The purpose of the coil 66 is to tend to limit and maintain constant the current flow through the rectifier. One end of the wire 66 is joined to the fuse clip 58 by means of the conductor 67, the other end being joined to the secondary 68 of the transformer by means of the conductor 69 (see Figures 4 and 5). The other fuse clip 59 is joined to the rod 44 connected to the tantalum cathode by means of the conductor 70. Positioned within the clips 58 and 59 is the ordinary cartridge fuse 71 such as is employed in connection with the electrical circuits of automobiles and other devices.

A fuse of about 6 amperes is employed and acts to open the circuit if the charger is reversely connected to the battery, or if a short circuit is established, and thus protects the charger from injury as well as acting as an alarm if the charger is improperly joined to the battery.

The electrical connections of the battery charging device will be more specifically described, reference being made to Figure 5. The primary 75 of the transformer is joined by means of the conductor pair 76 to the ordinary plug 77 which is adapted to be inserted in the socket 78, the terminals of which are joined to the conductors 79 and 80 of the ordinary light circuit of approximately 110 volts alternating current. One end of the secondary 68 is joined by means of the conductor 81 to the terminal clip 82. The other end of the secondary 68 is joined by the conductor 69 to the resistance 66, as previously described. The opposite end of the resistance 66 is connected by the conductor 67 to one end of the fuse 71, the opposite end of the fuse 71 being joined by conductor 70 to the tantalum cathode 15. The lead anode is joined by the conductor 83 to the terminal clip 84. The winding 68, the limiting coil 66 and the resistance of the transformer operate to limit the flow of current to a maximum of approximately 3½ amperes direct current.

It will be noted that the transformer limits the voltage to the rectifier not only when the current is flowing in the one direction permitted by the rectifier, but also when the current tends to flow in the other direction. In other words, the transformer limits the voltage whether there is actual current flow or not. The building up of excessive voltage across the rectifier during the non-current period is precluded. This protects the rectifier, which would otherwise soon disintegrate and break down if subjected to excessive voltage. Such would be the case if, for example, the resistance 68 were relied on to limit both the amperage and the voltage.

Figure 1:
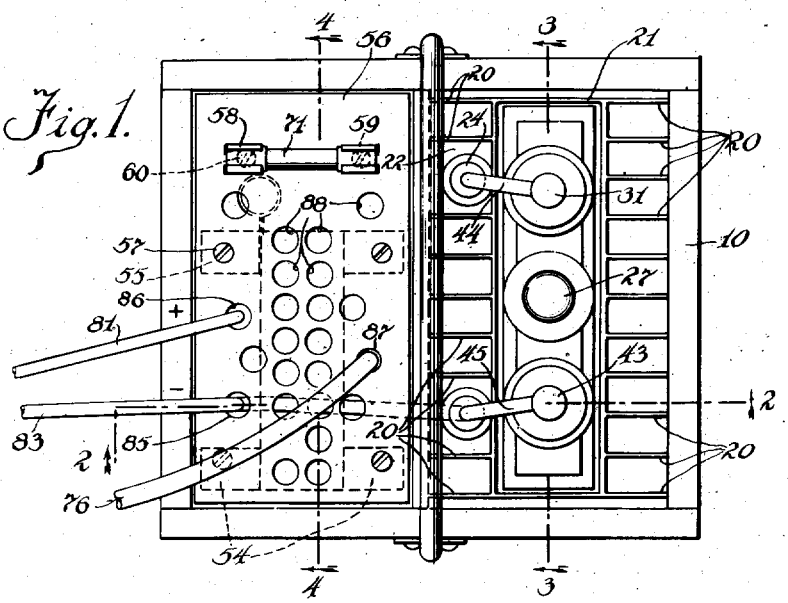
Figure 1 is a plan view of the complete charging unit.
Figure 2:
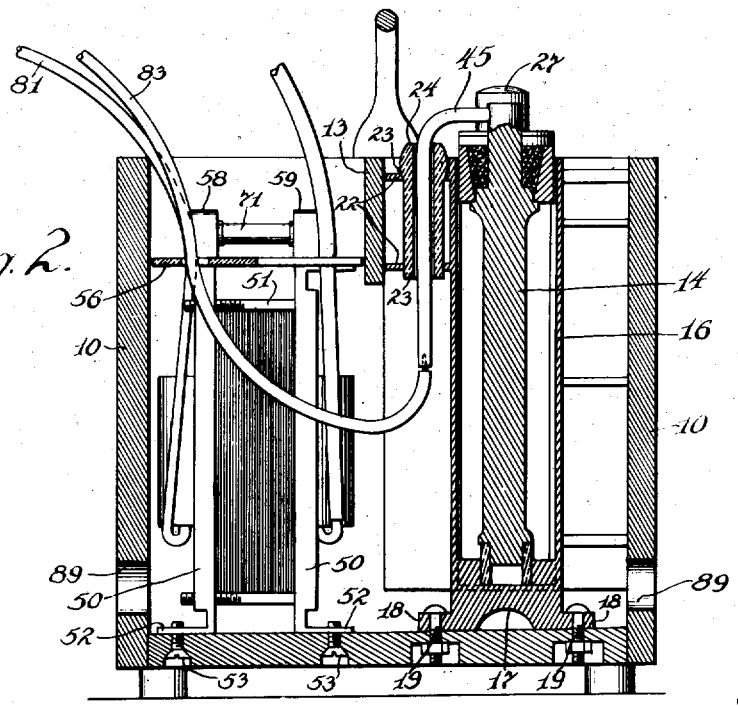
Figure 2 is a section on line 2—2 of Figure 1.
Figure 3:
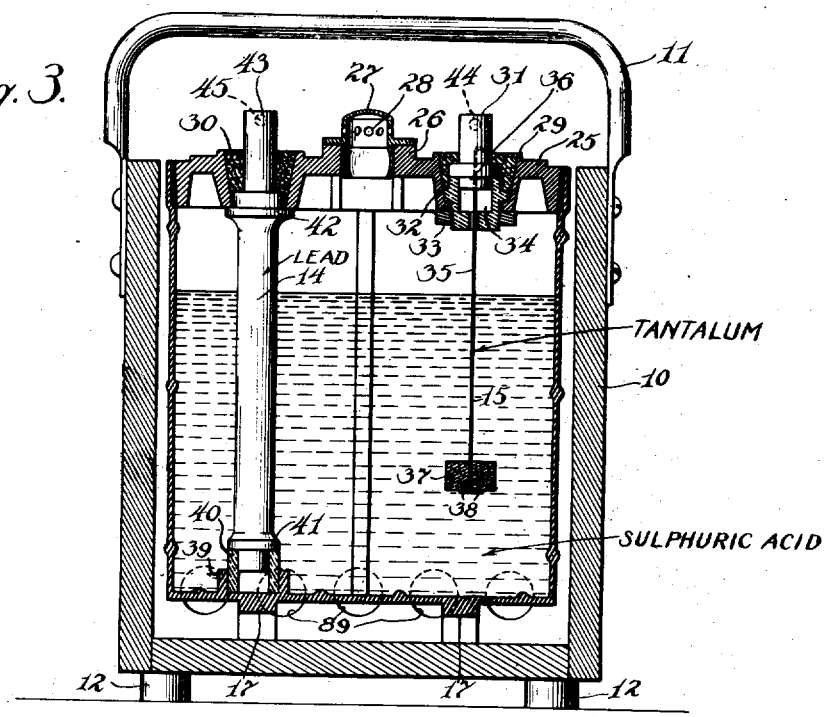
Figure 3 is a section on line 3—3 of Figure 1.

By reference to Figure 2, it will be noted that the conductor 83 is joined to the lower end of the rod 45 connected to the anode 14 and extends laterally and then upwardly through the opening 85 in the plate 56. The conductor 81 which extends from one end of the secondary 68 passes upwardly and out through the opening 86 in the plate 56. The pair 76, the conductors of which are joined to the opposite ends of the primary 75, passes upwardly through the opening 87 in the plate 56. The plate 56, in addition to the openings 85, 86 and 87 is provided with a plurality of openings 88. The sides of the container 10, adjacent to the bottom thereof, are provided with the openings 89. As shown, the openings 89 are provided only on two opposite sides of the box, but, if desired, they may be provided on all four sides. It will be noted that the cell 16 and also the transformer structure are maintained spaced from the bottom of the container. This arrangement permits air to enter the container through the openings 89 and pass upwardly freely about the transformer and out through the holes 88 in plate 56, and also upwardly between the wings or flanges 20 of the cell, thus greatly assisting in maintaining the charger cool while it is in use, which is quite essential to the most satisfactory operation.

It has been found that when the transformer employed with the rectifier, such as herein shown, is designed to give a certain charging rate, oftentimes the charging rate of the rectifier will suddenly change. This is believed to be due generally to some foreign matter having been introduced into the electrolyte. Applicant has discovered, that when a small quantity of metallic impurity, as for instance iron, is added to the electrolyte of dilute acid such as sulphuric or phosphoric acid, this tendency of the charging rate to fluctuate is largely obviated. Very good results are obtained by adding from one-half to one part per thousand of iron. The iron may be added as metallic iron, but is preferably introduced in the form of ferrous sulphate. It has been found that a slight excess of iron may be added to the electrolyte without injuriously affecting the rectifier. In practice the iron is introduced by adding about one gram of ferrous sulphate crystals to each 100 cubic centimeters of the electrolyte. Somewhat larger or smaller quantities of iron may be added with varying results. When the iron impurity is added to the electrolyte, the charging rate of the rectifier is materially increased, usually in the neighborhood of 50%, although sometimes much larger increases are brought about. In addition to increasing the charging rate, the addition of the iron to the electrolyte causes the heating effect of the rectifier to be relatively decreased. This is probably due to the iron acting to decrease the internal resistance of the rectifier.

In addition to increasing the charging rate and decreasing the relative heating effect, the introduction of the metallic impurity acts to render the rectifier more stable or constant in its charging rate. When the rectifier is operated without the ferrous sulfate addition to the electrolyte an excess voltage or excess current applied for a very short time so changes the characteristics of the film on the tantalum that when the voltage is again reduced to normal the current will not be the same as before the excess voltage but will be materially less, but when ferrous sulfate or other beneficial metallic additions are included in the electrolyte an excess voltage applied for a short time does not upon resumption to normal voltage prevent the current from returning to the same value as before the excess voltage was applied.

While iron has been found to give very good results when introduced into the electrolyte, applicant has discovered that certain other metallic impurities, as copper or silver, have, to a certain extent, the same effect as iron when added to the electrolyte.

It has been found that a rectifier constructed as above described will sometimes explode under exceptional circumstances, as when subjected to an overload. This may be due to the union of the hydrogen and oxygen liberated at the electrodes. It has been discovered that if a small amount of heavy oil is poured into the rectifier cell, the explosion of the cell is absolutely prevented. About two teaspoonfuls of pure heavy liquid petrolatum has been extensively employed with satisfactory results. The heavy oil forms a film over the top of the electrolyte and also an insulating film on the electrodes. This film may act to suppress sparks which otherwise would occur at one of the electrodes, or perhaps the film on the electrolyte retards the escape of the gas responsible for the explosions. At any rate, when the oil is employed the explosions are absolutely prevented. The oil film, in addition to preventing explosions, practically prevents fuming of the electrolyte and greatly reduces evaporation.

The battery charger herein disclosed has been designed to charge either 6 or 12 volt batteries. When employed in charging a 6 volt battery, it provides a maximum charging current of about 3½ amperes, and when used with a 12 volt battery, its charging rate is about ¼ ampere.

If a battery charger of the character herein disclosed is employed in connection with an electric power circuit, the voltage of which varies greatly from 110 volts, the transformer should be altered to give an output current similar to that herein described.

While in the drawings and in the above description, applicant has disclosed but a single set of details which show the preferred embodiment of his invention, it is to be understood that various modifications are contemplated and the invention should, therefore, be limited merely by the scope of the appended claims.

Having thus described my invention, what I claim as new and desire to secure by Letters Patent of the United States is:

1. An electrolytic rectifier for producing unidirectional current from a source of alternating current, said rectifier having an electrode of tantalum and an electrode of a non-filming conductor in an acid electrolyte containing a small percentage of metallic addition.

2. An electrolytic rectifier having an electrode of tantalum, an electrode of lead and an electrolyte of dilute sulphuric acid and means to limit the current to substantially three and one-half amperes passing between said electrolyte and said tantalum electrode.

3. A charger including a source of alternating current, such as a transformer winding, having an effective voltage of substantially eighteen and one-half volts, a tantalum electrode, a dilute sulphuric acid electrolyte, a non-filming electrode, and conductor means for connecting said elements in series with a battery to be charged.

4. In a battery charger, an electrolytic rectifier including a tantalum electrode in a dilute sulfuric acid, electrolyte having a small quantity of metallic impurity added thereto.

5. In a battery charger, an electrolytic rectifier including a tantalum cathode in an acid electrolyte, a cell containing said electrolyte, a terminal post of lead-antimony composition for said cathode, one end of said cathode being cast into said terminal post, a cover for said cell provided with a sleeve in which are positioned the adjoining ends of said cathode and post, and an acid resisting cement within said sleeve about said cathode below said post.

6. An electrolytic valve including a tantalum electrode in an acid electrolyte having a small quantity of iron added thereto.

7. An electrolytic rectifier including a tantalum electrode in a dilute sulphuric acid electrolyte having a small quantity of iron added thereto.

8. An electrolytic rectifier for converting alternating current into unidirectional current including a tantalum electrode in an electrolyte of sulfuric acid diluted to substantially 1.25 specific gravity.

9. The method of operating a rectifier having a tatalum electrode in an electrolyte, which consists in subjecting the circuit across said electrode and electrolyte to an effective alternating potential of eighteen and one half volts or less, and maintaining the resistance of the circuit such that the effective pulsating current between said electrode and electrolyte will not exceed three and one half amperes.

In witness whereof, I hereunto subscribe my name this 27th day of April, 1925.

EDGAR W. ENGLE.